Patented Feb. 14, 1933

1,897,794

UNITED STATES PATENT OFFICE

GEORGE HOLLAND ELLIS AND HENRY CHARLES OLPIN, OF SPONDON NEAR DERBY, ENGLAND, ASSIGNORS TO CELANESE CORPORATION OF AMERICA, A CORPORATION OF DELAWARE

DYEING OR OTHERWISE COLORING OF MATERIALS MADE WITH OR CONTAINING CELLULOSE ESTERS OR ETHERS

No Drawing. Application filed June 22, 1928, Serial No. 287,645, and in Great Britain July 19, 1927.

This invention relates to the dyeing, printing, stencilling or otherwise coloring of threads, yarns, knitted or woven fabrics, or other products made with or containing cellulose acetate or other organic acid esters of cellulose, such for example as cellulose formate, propionate, or butyrate, or the products obtained by the treatment of alkalized cellulose with esterifying agents (e. g. the product known as "immunized cotton" obtained by treatment with p-toluene sulpho-chloride), or made of or containing cellulose ethers, such for example as methyl, ethyl or benzyl cellulose, or the corresponding condensation products of cellulose and glycols or other polyhydric alcohols, all of which cellulose derivatives are hereinafter referred to as organic substitution derivatives of cellulose.

By the present invention materials made with or containing cellulose acetate or other organic substitution derivatives of cellulose are dyed, printed or stencilled by oxidizing on the material a suitable oxidizable amine or mixture of amines with the aid of chloramides and particularly aromatic acidyl chloramides such as sulphon-chloramides, of which p-toluene sulphon-chloramide is a typical example. The sulphon-chloramides may be used in the form of their salts, for example their sodium or other alkaline salts and the terms "chloramide, sulphonchloramide, etc.," as used in the claims are to be understood as including these salts.

Any suitable amines or mixtures of such may be employed and the following are examples only:— p-aminodiphenylamine
  2.4-diaminodiphenylamine
  p-aminophenol
  p-phenylenediamine
  aminonaphthols
  m-aminophenol
  α-naphthylamine The amines may be applied to the materials in any suitable manner. For example they may be applied by mechanical impregnation with a liquor of suitable concentration containing the amine or mixture of amines dissolved, suspended or dispersed in any way (for instance dispersed by the methods set forth in prior U. S. Patents Nos. 1,618,413 and 1,618,414, issued Feb. 22, 1927; U. S. Patent No. 1,690,481, issued Nov. 6, 1928; U. S. Patent No. 1,694,413, issued Dec. 11, 1928; U. S. Patent No. 1,716,721, issued June 11, 1929; and U. S. applications Ser. Nos. 152,-517 and 134,138, the material being squeezed and oxidized, with or without intermediate rinsing or washing, in a bath containing the chloramide. Alternatively the materials may be allowed to absorb the amine or amines substantively, as in dyeing, by manipulating them in the solutions, suspensions, dispersions or other preparations, the absorption being followed by oxidation either in the same bath or in a separate bath as in the method previously referred to. Again the chloramide may be incorporated in the solution, suspension, dispersion or the like of the amine or amines, the mixture being applied to the materials by any suitable means, such as printing, stencilling or uniform impregnation, and the materials subsequently subjected under suitable conditions to the action of warm air or steam to effect the necessary oxidation. After the development of the color the materials may be washed and finished as desired.

The activity of the chloramides may be catalytically increased by acidic conditions or by salts of iron, copper, vanadium or the like.

The process of the invention may be applied to the coloring of mixed materials comprising, in addition to the cellulose acetate or other organic substitution derivatives of cellulose, natural or artificial fibres. In coloring such mixed goods, where mechanical impregnation methods are employed, both or all components are generally covered in a similar or approximately similar way. When however the "absorption" method is employed, the cellulose acetate component for example will take up the amine more strongly and under some conditions the fibre or material used in association may resist the amine completely. The mixed goods may be dyed or otherwise colored with other coloring matters either before or after the application or oxidation of the amines, for example with coloring matters which resist the cellulose ester or ether portion of the goods, so that two or multi-colored effects may be produced. Such coloring matter if applied before the oxidation should be capable of resisting the oxidizing agent.

Alternatively coloring matters capable of resisting the oxidizing agent may be incorporated in the preparation of the amine or amines for impregnation or absorption either for mixed or unmixed goods with the consequent possibility of modifying the color produced by the simple oxidation of the amine or amines and with mixed materials of producing a modified or distinctive coloration on the non-ester or non-ether component.

The following examples illustrate the invention but are not to be regarded as in any way limiting it:—

*Example 1*

To dye 100 lbs. of cellulose acetate knitted goods black:—

4 lbs. para-amino-diphenylamine are ground into a paste with 24 lbs. 50% Turkey red oil, heated to 90–95° C. with stirring, and diluted with hot soft water. The whole is added through a filter cloth into a 30:1 bath at 40° C. and the previously scoured fabric is dyed in this liquor in a suitable machine, the liquor being raised durng 1 hour from 40° to 80° C., and maintained a further hour at the latter temperature. This bath is then run off, and the fabric washed ¼ hour in warm soft water.

Oxidation is carried out as follows:—

12 lbs. of para-toluene sulphon-chloramide sodium salt

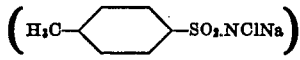

are dissolved in 300 gallons of water, heated to 75° C., and the fabric entered. 4 lbs. of glacial acetic acid, diluted twenty times with water, are now added during half an hour. Oxidation commences immediately and is complete after a further quarter of an hour. After washing off thoroughly in cold water the fabric is scoured in a ¼% soap bath for ½ hour, at 60–70° C., rinsed, and dried or otherwise treated as requisite.

*Example 2*

To dye 100 lbs. cellulose acetate yarn a dark reddish brown:—

5 lbs. of 4-chlor-2-amino-4'-ethoxy-diphenylamine (obtained by acid reduction of 4-chlor-2-nitro-4'-ethoxy-diphenylamine) are ground into a paste with 30 lbs. of 50% sodium resinate, heated to 90–95° C. with stirring, and diluted with hot soft water. The whole is then added through a filter cloth into a 30:1 dyebath at 40° C., and dyeing carried out as in the previous example.

Oxidation is carried out exactly as in Example 1, using the quantities of para-toluene sulphon-chloramide sodium salt and acetic acid there cited, after which the goods are washed off, soaped in a 2½ gram per litre soap bath for ½ hour at 60° C., rinsed and dried or otherwise treated as requisite.

*Example 3*

To dye 100 lbs. of cellulose acetate/cotton knitted goods (50:50), the cellulose acetate brown, and the cotton red.

3 lbs. of alpha-naphthylamine are dispersed by warming with 10 lbs. 50% Turkey red oil. The dispersion is then diluted cautiously with 10 gallons of hot ¼% soap solution, and passed through a filter cloth into a bath of 300 gallons of soft water containing 10 lbs. of olive oil soap.

The goods are entered, and absorption of the alpha-naphthylamine allowed by working for ¾ hour during which the bath is raised from cold to 80° C. and for a further hour at 80° C.

The goods are then lifted, rinsed, and treated in a 300 gallon bath containing 15 lbs. p-toluene sulphon-chloramide sodium salt at 75° C., a solution of 3 lbs. of glacial acetic acid in 3 gallons of water being added with stirring immediately before entering the goods. After 20 minutes a medium brown will have developed on the cellulose acetate, the cotton being substantially undyed.

The goods are now lifted, soaped lightly, for example in a ¼% soap solution for 15 minutes at 60° C., and the cotton dyed at 75° C. in the usual manner in a 300 gallon bath containing 2% of the direct cotton dyestuff known as chlorazol fast red K. (Color Index 278) and 10 lbs. of common salt. The goods are then lifted, rinsed, and dried or otherwise treated as requisite.

*Example 4*

To obtain a deep bronze-brown on cellulose acetate woven fabric:—

The goods are padded in a solution of—

|  | Parts |
|---|---|
| Para-phenylene diamine | 10 |
| Para-amino-phenol | 10 |
| Industrial alcohol | 15 |
| Turkey red oil 50% | 40 |
| Gum arabic 1:1 | 60 |
| Water to | 200 |

The fabric is then squeezed between rollers set so that after squeezing the material retains 80% of its weight of pad liquor. It is now dried in a chamber at 60–80° C., and padded in a solution of—

|  | Parts |
|---|---|
| P-toluene sulphon-chloramide sodium salt | 15 |
| Gum arabic 1:1 | 40 |
| Vanadium chloride 1/100 | 1 |
| Water to | 200 |

The material is squeezed and dried as before, and passed through a continuous "ager" with both wet and dry bulb thermometers reading 100° C.

The fabric is then rinsed in lukewarm water, soaped in a ¼% soap solution for ¼ hour at 60° C., rinsed and dried or otherwise treated as requisite.

Instead of the cellulose acetate materials treated in the above examples, materials made with or containing other organic substitution derivatives of cellulose for example cellulose formate, propionate or butyrate, "immunized cotton", ethyl cellulose, methyl cellulose or benzyl cellulose may be similarly treated. Instead of the amines specified other amines may be employed and instead of p-toluene sulphon-chloramide other sulphon-chloramides or other chloramides may be used.

The term dyeing in the appended claims is to be understood to include printing, stencilling and other methods of coloring the goods.

What we claim and desire to secure by Letters Patent is:—

1. In a process for dyeing materials comprising organic substitution derivatives of cellulose by oxidizing amines on the material, the step of oxidizing by means of an aromatic sulphon-chloramide.

2. In a process for dyeing materials comprising organic substitution derivatives of cellulose by oxidizing amines on the material, the step of oxidizing by means of p-toluene sulphon-chloramide.

3. In a process for dyeing materials comprising cellulose acetate by oxidizing amines on the material, the step of oxidizing by means of an aromatic sulphon-chloramide.

4. In a process for dyeing materials comprising cellulose acetate by oxidizing amines on the material, the step of oxidizing by means of p-toluene sulphon-chloramide.

5. In a process for dyeing materials comprising cellulose acetate by oxidizing amines on the material, the step of oxidizing by means of an aromatic sulphon-chloramide under acidic conditions.

6. In a process for dyeing materials comprising cellulose acetate by oxidizing amines on the material, the step of oxidizing by means of p-toluene sulphon-chloramide under acidic conditions.

7. In a process for dyeing materials comprising cellulose acetate by oxidizing amines on the material, the steps of absorbing the amine substantively from a bath and oxidizing by means of an aromatic sulphon-chloramide.

8. In a process for dyeing materials comprising cellulose acetate and cotton by oxidizing amines on the material, the steps of absorbing the amine substantively from a bath and oxidizing by means of an aromatic sulphon-chloramide.

In testimony whereof, we have hereunto subscribed our names.

GEORGE HOLLAND ELLIS.
HENRY CHARLES OLPIN.